UNITED STATES PATENT OFFICE.

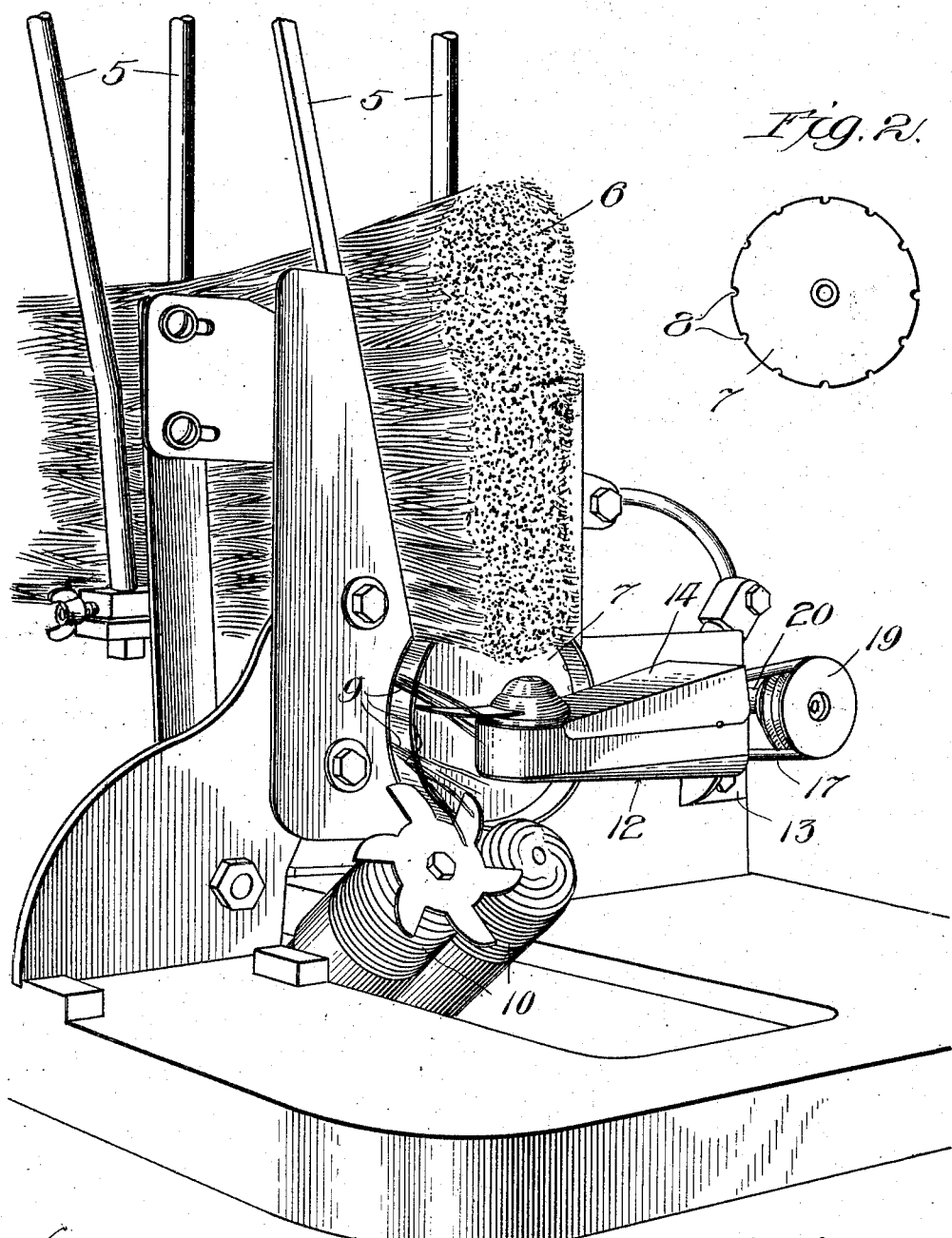

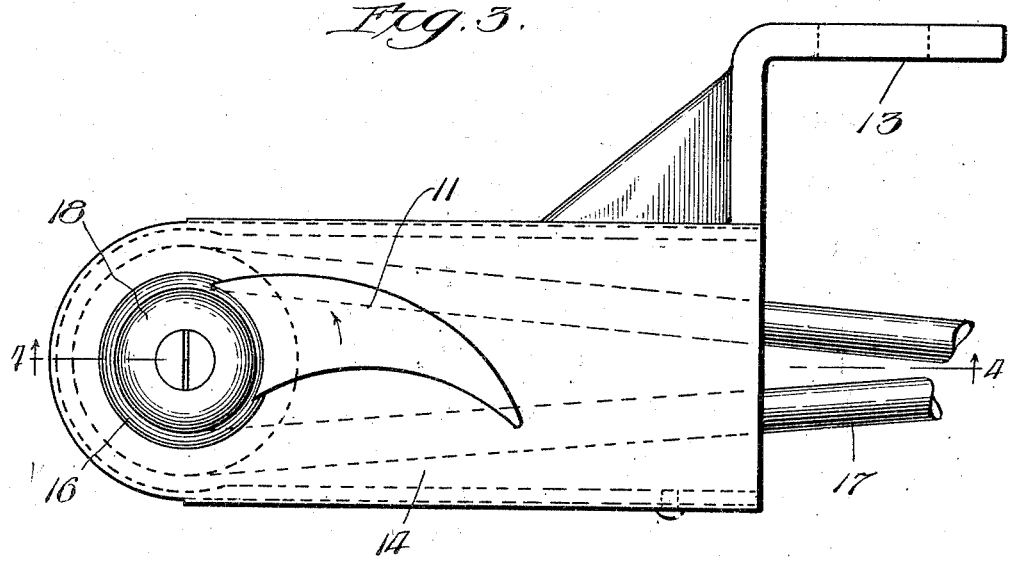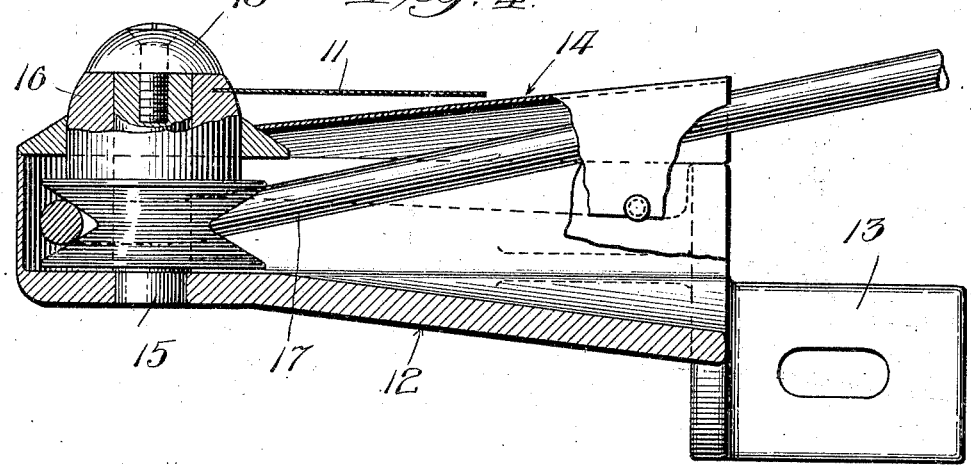

OSSIAN T. WAITE, OF OSHKOSH, WISCONSIN.

GRASS-TWINE MACHINE.

1,308,536.   Specification of Letters Patent.   Patented July 1, 1919.

Application filed September 10, 1917. Serial No. 190,583.

*To all whom it may concern:*

Be it known that I, OSSIAN T. WAITE, a citizen of the United States, residing at Oshkosh, in the county of Winnebago and State of Wisconsin, have invented certain new and useful Improvements in Grass-Twine Machines, of which the following is a specification.

The present invention has to do with improvements in the construction of grass twine spinning machines and the like, although it will presently appear that the features of the invention are not necessarily limited to use in this particular type of machine. In order however, that the features of the invention may be better understood and appreciated by those skilled in the art, I will describe the said features as applied to a machine for use in the manufacture of grass twine.

In the manufacture of twine from grass and similar fibrous raw material use is frequently made of machines in which the spears of grass are laid together in a large bundle from which they are selected or drawn in tufts or bunches. Each of these tufts includes only a few spears of grass, but in order that the ensuing operations may be successfully practised it is quite necessary that the spears of grass should lie straight and even in their butt ends.

When the bunch of grass is laid into the machine the butt ends of the spears invariably tangle together to a greater or less extent. The result is that the spears of grass in one bunch selected from the bundle do not always separate properly from another bunch selected from the bundle so that two or more of the selected bunches go into the rollers of the machine as a single bunch thereby largely destroying the selecting operation. Furthermore, where the bunches so selected become tangles it follows that the surface of the twine becomes roughened.

The main object of this invention is to provide means for combing or smoothing out the butt ends of the spears of grass selected in each bunch so as to separate the spears from each other and from the spears of any other bunches. In this way the butt ends of the spears will be caused to lie perfectly smooth and parallel to each other thereby over-coming the aforementioned difficulties.

Another object or advantage to be derived from this invention is that the bundle of grass may be laid into the machine in such a position that the butt ends of the spears of grass will project considerably farther beyond the machine than formerly. This will insure a more perfect selection of the grass spears by the selecting teeth and will largely prevent any tendency to leave a large percentage of the spears in the bundle and unacted upon by the selecting teeth.

Another difficulty which has been encountered previously in the handling of the grass is that where it is damp its butt ends will tend to stick together to a greater or less extent so that there has hitherto been difficulty in making use of damp material. By combing out the butt ends of the grass the tendency for the spears to stick together is largely overcome, thus making it possible to use a very large proportion of raw material which is damp.

Other objects and uses of the invention will appear from a detailed description of the same which consists in the features of construction and combination of parts hereinafter described and claimed.

Referring to the drawings:

Figure 1 shows in perspective a familiar type of grass twine or spinning machine having attached thereto an attachment embodying the features of the present invention, Fig. 2 is a detailed view of a familiar form of selecting disk for use in the machine shown in Fig. 1

Fig. 3 is a plan view on enlarged scale showing the detailed construction of the combing attachment which is embodied in the construction shown in Fig. 1 and, Fig. 4 is a vertical section taken on the line 4—4 of Fig. 3 looking in the direction of the arrows.

Before proceeding with the detailed description of the invention I will state that for purposes of convenience in illustration and description I have shown the same as being applied or adapted to a grass twine or spinning machine of a particular and familiar construction, but it is to be understood that in so doing I do not limit myself to the application of the invention to this particular type of machine except as I may limit myself in the claims.

The machine illustrated in the drawings is provided with suitable arms or the like 5 for supporting the bundle of grass 6 from which the blades are to be selected. The selecting is accomplished in the first instance by a rotating disk 7 having the notches 8, as shown in Fig. 2. As this disk rotates, it selects the bunches 9 and carries them down to a point where they will be grasped by the rollers 10. These rolls deliver the bunches of grass to the spinning mechanism in a familiar manner. I will not further concern myself with a particular description of the mechanism of the machine because, as previously stated, any suitable machine may be used.

The bunches of grass selected by the disk 7 are supposed to be quite separate and distinct from each other. That is, each bunch of grass ought to be distinctly separated and disconnected from the rest of the grass. However, as previously explained, difficulty has, in the past, been encountered in the operation of these machines by reason of the tendency of the butt ends of the grass to stick or catch together. This is particularly true where the grass is moist or damp.

The main feature of the present invention consists in the provision of a suitable form of combing or stripping mechanism for combing out the blades of grass as they are selected from the bundle 6, and particularly for combing out their butt ends so as to thoroughly and completely separate said butt ends from each other. I, therefore, provide a suitable form of combing mechanism in conjunction with the selecting mechanism, which combing mechanism serves to comb apart the butt ends of the blades as they are selected from the bundle.

In the particular construction illustrated, this combing mechanism takes the form of a thin blade or tooth 11 which rotates at high speed in a proper position to comb out the butt ends of the blades selected by the disk 7. The combing tooth may take any suitable form, but the form illustrated in detail in Figs. 3 and 4 have been found to be very well adapted for this work. The blade therein illustrated is similar to that of a simitar and it rotates with its convex edge in front, as shown by the arrow in Fig. 3. The plane in which this blade rotates is generally parallel to the direction of the blades as they are selected. Furthermore, the comb 11 should rotate at such a speed as to fully comb out the butt ends of the bunch of grass during the time consumed by said bunch in moving past the position of the comb.

Any suitable means may be provided for rotating the comb, but that shown in detail in Figs. 3 and 4 is found to be very successful. The construction therein illustrated includes a casting 12 having a bracket 13 by means of which it may be attached to a stationary part of the frame, as shown in Fig. 1. This casting is chambered, and a sheet metal cover 14 serves to cover over and protect its upper edge. A stud 15 is secured within the chamber near the outer end thereof. A pulley block 16 is rotatably mounted on the stud 15, the blade 11 being secured into the head portion of the pulley block, and the lower portion of the pulley block being grooved for the accommodation of the driving belt 17. A cap piece 18 fastens onto the upper end of the stud 15 and serves to hold the pulley block in place thereon.

The belt 17 passes through the length of the chamber and runs over a driving pulley 19 mounted on the shaft 20 which is operatively connected to the selecting or spinning mechanism, so as to drive the comb at the proper speed.

While I have herein shown and described only a single embodiment of the features of the present invention, still it will be understood that I do not limit myself to the said embodiment, except as I may do so in the claims.

I claim:

1. The combination with the selecting mechanism of a grass twine machine, said selecting mechanism including a notched selecting disk adapted to select bunches of grass from a bundle, of a combing blade rotatably mounted in advance of said selecting disk in position to operate upon the butt ends of the bunches of grass selected by the disk, and means for rotating said combing blade at high speed during the selecting operation, to thereby cause the blade to engage with the butt ends of a selected bunch of grass a plurality of times during the movement of said bunch of grass past the position of the blade, substantially as described.

2. The combination with the selecting mechanism of a grass twine machine, said selecting mechanism including a notched disk adapted to select bunches of grass from a bundle, of a combing blade adjacent to said disk, a pivotal mounting for the blade, the axis whereof lies substantially at right angles to the direction of the blades selected, and means for rotating the blade at high speed during the selecting operation, to thereby cause the blade to traverse the position occupied by a selected bunch a plurality of times during the travel of said bunch past the position of the blade, substantially as described.

3. The combination with the selecting mechanism of a grass twine machine, of a combing blade, and means for moving said combing blade in a direction substantially parallel to the direction of the blades of grass, and through the position occupied by the butt ends of the blades of grass during the selecting operation, substantially as described.

OSSIAN T. WAITE.

Witnesses:
REED O. DAVIS,
H. J. SCHOMER.

Copies of this patent may be obtained for five cents each, by addressing the "Commissioner of Patents, Washington, D. C."